United States Patent [19]

Dawson et al.

[11] 4,315,202
[45] Feb. 9, 1982

[54] SYNCHRONOUS MOTORS

[75] Inventors: John Dawson, Northampton; Stephen M. Buckley, Rugby, both of England

[73] Assignee: Associated Electrical Industries Limited, London, England

[21] Appl. No.: 138,865

[22] Filed: Apr. 8, 1980

[30] Foreign Application Priority Data

Apr. 19, 1979 [GB] United Kingdom ............... 13629/79

[51] Int. Cl.³ .............................................. H02P 1/46
[52] U.S. Cl. .................................. 318/718; 318/732; 318/803; 318/806
[58] Field of Search ............... 318/710, 711, 712, 713, 318/714, 716, 717, 718, 732, 803, 805, 806, 822, 828

[56] References Cited

U.S. PATENT DOCUMENTS

| | | | |
|---|---|---|---|
| 3,100,279 | 8/1963 | Rohner | 318/711 |
| 3,350,613 | 10/1967 | Brockman et al. | 318/718 |
| 3,381,195 | 4/1968 | Hoffmann | 318/718 |
| 3,405,338 | 10/1968 | Frola | 318/718 |
| 3,599,236 | 8/1971 | Hutchkins | 318/718 |
| 3,798,522 | 3/1974 | Pisecker et al. | 318/718 |
| 3,959,702 | 5/1976 | Godwin et al. | 318/713 |
| 4,027,216 | 5/1977 | Rozek | 318/712 X |
| 4,038,589 | 7/1977 | Heyne et al. | 318/713 X |
| 4,128,792 | 12/1978 | Herzog et al. | 318/714 X |

OTHER PUBLICATIONS

"The Synchro-Pac Brushless Engine-type Synchronous Motor" by K. L. Hanson-1100-TEC-1199 of Electric Machinery Mfg. Co., 1965.

"The Synchro-Pac Brushless Synchronous Motor" by K. L. Hanson and T. G. Rohner-Electric Machinery Mfg. Co.

*Primary Examiner*—J. V. Truhe
*Assistant Examiner*—Richard M. Moose
*Attorney, Agent, or Firm*—Kirschstein, Kirschstein, Ottinger & Cobrin

[57] ABSTRACT

A synchronization arrangement for delaying excitation of the field winding (5) of a brushless synchronous motor until the motor rotor has run up approximately to synchronous speed in which the appropriate moment for applying the field excitation is determined by monitoring two signals respectively representative of the currents in two rectifying devices (11, 15) scparately connected, oppositely poled, across the motor field winding.

8 Claims, 3 Drawing Figures

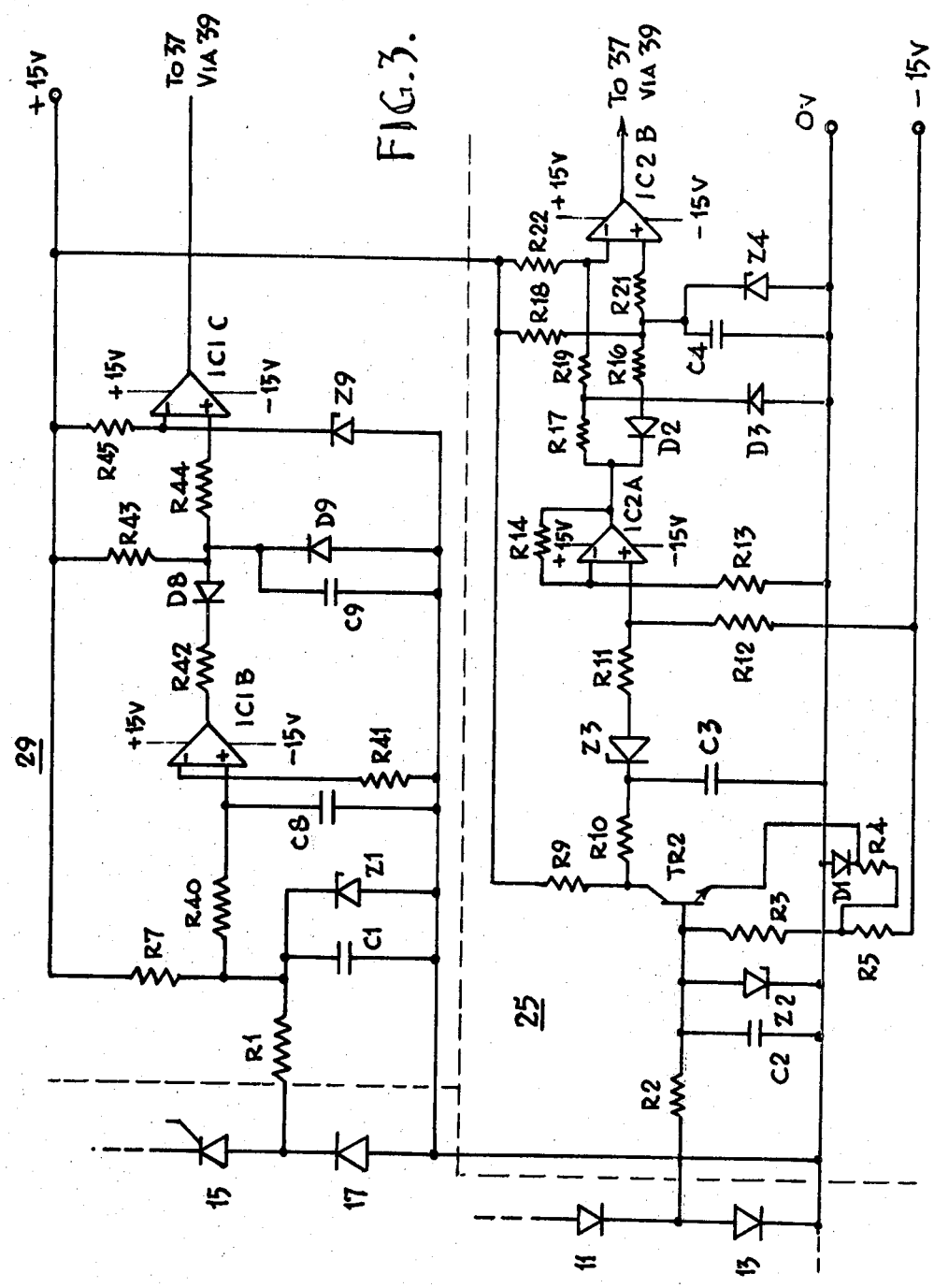

SYNCHRONOUS MOTORS

This invention relates to synchronous motors.

The invention relates particularly to synchronous motors of the kind comprising a rotor mounted field winding arranged for excitation by the rectified output of an a.c. exciter winding mounted on the rotor, and a synchronising arrangement for delaying energisation of the field winding by the exciter until the rotor is rotating approximately at the same speed as the rotating field produced by the stator winding of the motor, and the rotor is correctly positioned relative to this rotating field. Such a synchronous motor is hereinafter referred to as a synchronous motor of the kind specified.

In known synchronous motors of the kind specified the synchronising arrangement uses as its control voltage the voltage induced in the field winding under slip conditions and/or a voltage developed across a so-called starting resistance connected across the field winding. Whilst such arrangements can be made to work satisfactorily, they exhibit several shortcomings. In particular, careful adjustment of the variable settings of the arrangement to suit the particular motor with which it is used is required. In addition the occurrence of ripple voltages across the field winding can be a problem.

It is an object of the present invention to provide a synchronising arrangement for a synchronous motor of the kind specified wherein such problems are alleviated.

According to the present invention a synchronising arrangement for a synchronous motor of the kind specified comprises: a pair of rectifying devices for connection separately, oppositely poled, across the motor field winding, one of the devices being controllable and poled so as to be forward biassed by the rectified output of the a.c. exciter; trigger means for the controllable device whereby the controllable device is rendered conducting when the voltage across the field winding forward biasses said controllable device and exceeds a predetermined value; means for deriving two signals respectively representative of current flow in the two rectifying devices; and control means responsive to said two signals for connecting the field winding with the rectified output of the a.c. exciter when no current has passed through the controllable rectifying device for a predetermined time, or the motor field winding current, as indicated by the current in either rectifying device, has a frequency below a predetermined value, the controllable rectifying device is not conducting, and the uncontrolled rectifier has started to conduct.

Preferably said means for deriving said signals comprises two further uncontrolled rectifying devices respectively connected in series with and with the same polarity as said first-mentioned pair of rectifying devices, and said control means is responsive to the voltage across said further rectifying devices.

One synchronous motor incorporating a synchronising arrangement in accordance with the invention will now be described by way of example with reference to the accompanying drawings in which:

FIG. 3 is a circuit diagram of a part of the control unit of FIG. 2.

Figure 1:
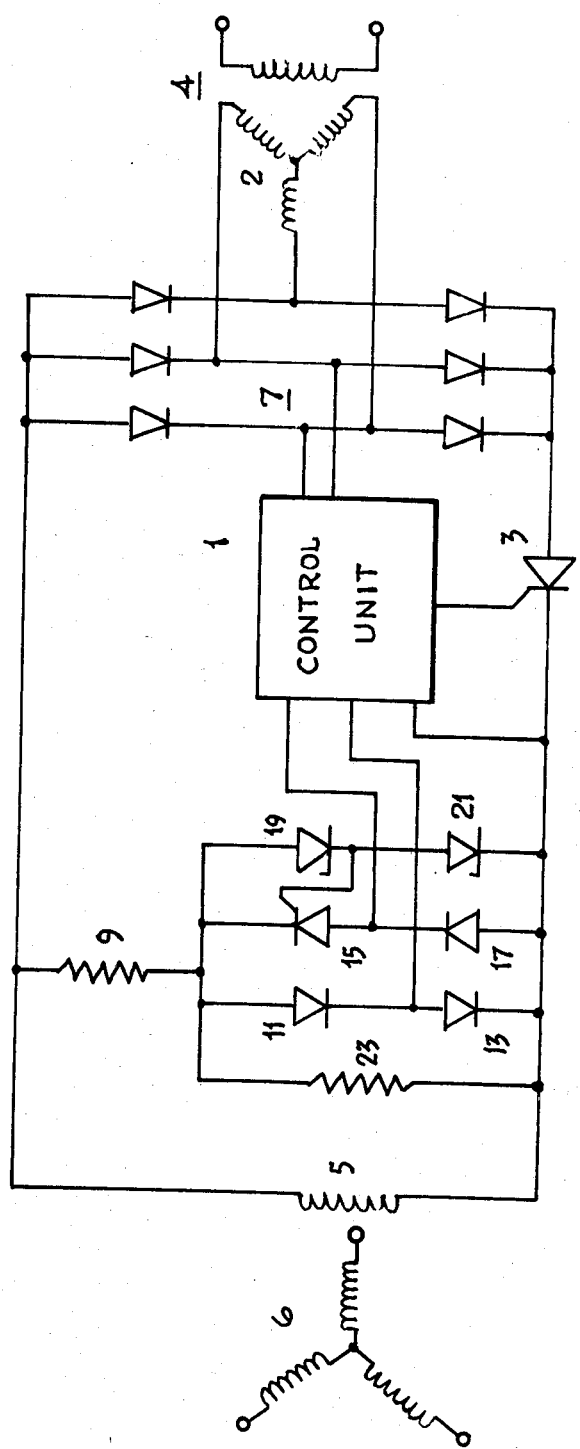
FIG. 1 is a schematic diagram of the motor and its synchronising arrangement.

Referring to FIG. 1, the synchronising arrangement includes a control unit 1 whose purpose is to fire a thyristor 3 when the rotor of the synchronous motor has been run up to speed, thereby supplying the rotor field winding 5 of the motor with direct current derived by a 3-phase rectifying bridge 7 from the rotor winding 2 of an a.c. exciter 4. The a.c. exciter rotor 2, together with the rectifying bridge 7 and synchronising arrangement are mounted on the shaft (not shown) of the synchronous motor, the motor thus being of the kind commonly referred to as brushless.

The control signals required by the unit 1 in order that the thyristor 3 may be fired at the correct time are derived from a network connected across the field winding 5.

The network comprises a starting resistance 9 connected in series with two like poled rectifier diodes 11 and 13 across the winding 5, and with a thyristor 15 and a further rectifier diode 17 across the winding 5, the thyristor 15 and diode 17 being oppositely poled to the diodes 11 and 13 and being poled so as to be forward biassed by the output of the bridge 7. The trigger electrode of the thyristor 15 is connected to the junction between two zener diodes 19 and 21 connected in parallel with the thyristor 15 and diode 17, and a holding resistance 23 is connected across the diodes 11 and 13 and hence in series with the starting resistance 9 across the winding 5.

Two control signals for the unit 1 are derived from across the diodes 13 and 17 respectively.

In operation, as the motor is being run up to speed, the rotating field produced by the motor stator winding 6 induces a slip frequency alternating e.m.f. in the winding 5. During alternate half cycles of this e.m.f. when the upper end of the winding (as shown in FIG. 1) is positive, current flows in the resistance 9 and the diodes 11 and 13 and the resulting voltage drop across diode 13 provides a first input signal to the unit 1. During the other half cycles of the induced e.m.f. in winding 5 no current flows in resistance 9 until the zener diodes 19 and 21 reach their reference voltage. The thyristor 15 then fires and remains conducting for the remainder of the half cycle, the resulting voltage drop across diode 17 providing a second input signal to the unit 1.

Figure 2:
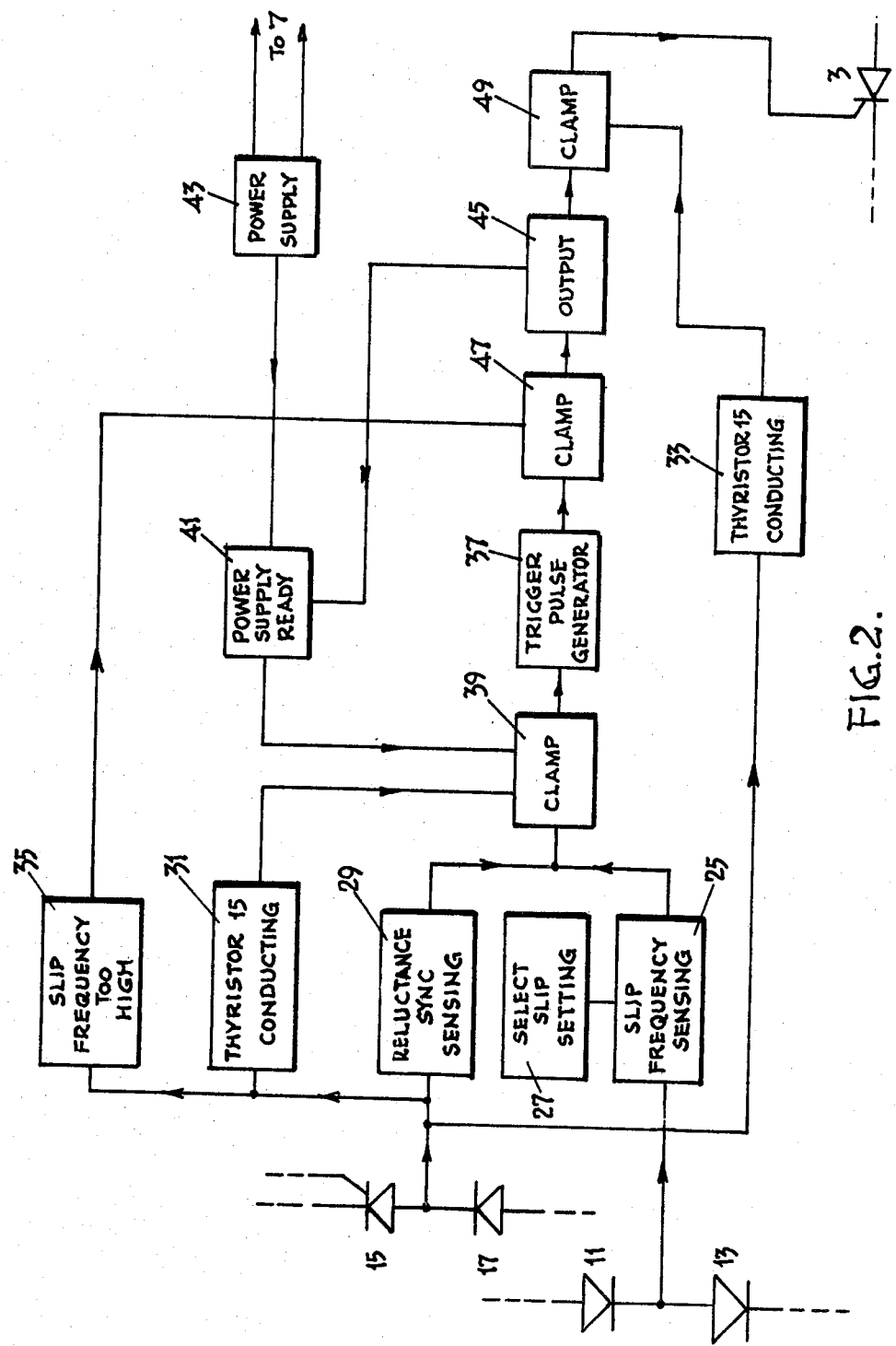
FIG. 2 is a block diagram illustrating a control unit forming part of the synchronising arrangement.

The control unit 1 and the manner in which the two input signals are utilized by the control unit will now be described with reference to FIG. 2.

The first input signal is utilised by a circuit 25 of the unit 1 to determine the slip frequency of the rotor. If the slip frequency is below a value e.g. 1.6 Hz set by a circuit 27 at which it is safe to excite the field winding 5, an output signal is generated by the circuit 25.

The second input signal is utilised by a circuit 29 to produce an output signal if the thyristor 15 has not conducted for a predetermined period sufficiently long, e.g. 3 seconds, to indicate that the motor rotor is synchronised. This is used to indicate that the motor rotor has synchronised on reluctance.

The second signal is further utilised by circuits 31 and 33 to produce output signals when the thyristor 15 is conducting, and by a circuit 35 to produce an output signal if the slip frequency is above a predetermined value e.g. 5 Hz above which the field excitation should under no circumstances be applied.

The condition that thyristor 15 is not conducting is conveniently sensed in circuits 31 and 33 by determining whether the voltage across diode 17 exceeds the sum of the forward voltage drops across thyristor 15 and diodes 11 and 13 which is clearly the maximum possible voltage across diode 17 when thyristor 15 is conducting.

The outputs of the circuits 25 and 29 are applied to a thyristor trigger pulse generator 37 via a clamp 39 controlled by the circuit 31 so that the circuit 37 cannot operate unless the thyristor 15 is not conducting. The clamp 39 is further controlled by a circuit 41 to prevent operation of the circuit 37 if the power supply 43 for the unit is producing an output too low for an output circuit 45 of the unit to produce a full-sized triggering pulse for the thyristor 3.

When the circuit 25 produces an output indicating the slip frequency is sufficiently low for the field winding to be excited, and the clamp 39 is not in its blocking condition indicating that the thyristor 15 is not conducting and the power supply is adequate, the generator 37 produces a single output pulse each time the diode 13 starts to conduct. When the circuit 29 produces an output indicating the motor is running at synchronous speed (due to reluctance synchronisation), the generator 37 produces a train of pulses, typically at a rate of 3 per second.

The output of generator 37 is applied via a further clamp circuit 47 to the output circuit 45, the clamp 47 being controlled by the output of circuit 35 so that the circuit 45 produces pulses corresponding to the output of generator 37 only if the slip frequency is not too high for excitation. The output of the circuit 45 is applied to the trigger electrode of thyristor 3 via a further clamp circuit 49 controlled by the output of circuit 33 to further ensure that triggering of the thyristor 3 does not occur whilst the thyristor 15 is conducting. It will be appreciated that once the motor has synchronised trigger pulses continue to be applied to the thyristor 3 so long as the machine is running so that if for any reason the thyristor 3 becomes non-conducting it is rapidly refired, so long as the correct conditions for excitation prevail.

During normal synchronising from a small finite slip, i.e. in response to an output from circuit 25, the diodes 11 and 13 are conducting when thyristor 3 is triggered and their current transfers to the thyristor 3 when it is triggered so that sufficient current flows in thyristor 3 to hold it conducting.

In the event that the thyristor 3 should not hold in conduction, re-triggering of the thyristor 3 will occur each time the diode 13 starts to conduct until eventually either the thyristor 3 holds in conduction, or the motor synchronises on reluctance.

During synchronisation on reluctance when a train of trigger pulses is applied to thyristor 3 in response to an output signal from circuit 29, the induced e.m.f. in winding 5 will normally vary due to motor shaft swinging and rectification of harmonic voltages. If the thyristor 3 is first triggered at a time when the induced e.m.f. is such that the diodes 11 and 13 are conducting, then the thyristor 3 is likely to hold in conduction. At other times when the thyristor 3 is first triggered the induced e.m.f. in winding 5 may be forward biassing the thyristor 15 so that no current is flowing in diodes 11 and 13, and the thyristor 3 may or may not hold in conduction, depending on the relative values of the induced e.m.f. in winding 5 and the excitation voltage. However, the thyristor 3 will eventually hold on subsequent triggering when the induced e.m.f. has fallen.

In the event that in the reluctance synchronised condition no shaft swinging or harmonic voltage rectification occurs so that the field winding 5 presents a large 'dead' inductance to the exciter through thyristor 3, a long trigger pulse to hold thyristor 3 conducting would be needed giving rise to excessive power dissipation in the trigger pulse circuit. To avoid this the holding resistance 23 across diodes 11 and 13 is provided.

In the event of reluctance synchronisation on the wrong pole, excitation of the field winding 5 will cause the motor rotor to slip a pole. This may cause the thyristor 3 to turn off, in which case it will be retriggered by the next output pulse of the circuit 45 so long as thyristor 15 has not become conducting. If thyristor 15 has become conducting due to the pole slipping, then the unit reverts to normal finite slip synchronising under control of the output of circuit 25.

Similar retriggering of thyristor 3 will occur if the motor pulls out after operating synchronously.

The power supply for the unit 1 is taken from the rectifier bridge 7. This gives an added safety factor since a trigger pulse cannot be delivered to thyristor 3 unless the power supply for exciting the field winding 5 is present.

As a further safety precaution a further rotor speed sensing arrangement separate from the unit 1 may be provided to prevent application of the exciter field and hence prevent operation of the unit if this sensing arrangement indicates that the rotor speed is not suitable for excitation of the motor field winding 5.

If desired the control unit 1 may be arranged to provide two or more parallel outputs for respectively firing two or more parallel thyristors, thus avoiding the need for cross firing circuits.

It will be understood that slip frequency could be determined from the current in diodes 15, 17 instead of from the current in diodes 11, 13.

It will be appreciated that the arrangement described above is capable of very reliable operation. This reliability in large part stems from the fact that the arrangement operates in response to two signals respectively representative of the actual currents flowing in the two unidirectional current paths in series with the starting resistance 9. Comparable prior art arrangements operate in response to the voltage across the field winding or the starting resistance. Consequently in such prior arrangements it is difficult with small currents to distinguish between current conduction in one unidirectional path, zero current, and current conduction in the other unidirectional path, so that the possibility of applying excitation at a highly undesirable time, i.e. when thyristor 15 is conducting, is always present.

The circuits of the unit 1 may take any convenient conventional form. One suitable form for the sensing circuits 25 and 29 is illustrated in FIG. 3.

In this particular arrangement, during normal synchronisation the input signal to circuit 25 is about −2 volts when diode 13 is not conducting, as determined by zener diode Z2 and resistor R2, and rises to about 1 volt when diode 13 conducts. The input signal to sensing circuit 29 is about +2 volts when diode 17 is not conducting, as determined by zener diode Z1 and resistor R7, and falls to about −1 volt when diode 17 conducts.

While the diodes 11 and 13 are not conducting the input signal to circuit 25 turns off transistor TR2, which after a time delay of about 0.1 ms, pulls the voltage at the cathode of zener diode Z3 above the zener level via resistor R9 and allows diode Z3 to conduct. This causes the output of the non-inverting amplifier IC2A to switch from the negative rail to the positive rail. A main timing capacitor C4 can now charge up via resistor R18, from its base level of about −0.8 volts set by a forward biased zener diode Z4. The capacitor C4 continues to charge up until either the output of amplifier IC2A switches to the negative rail (when diode 13 starts conducting) or 10 volts is reached and the zener diode Z4 clamps the voltage on the capacitor C4. When the output of amplifier IC2A falls to the negative rail, capacitor C4 discharges through resistor R16 and diode D2, but at the same time the voltage on the capacitor C4 is compared with a preset aiming level derived from a voltage divider comprising resistances R19 and R22.

When the output of amplifier IC2A is positive the aiming level is approximately at the positive rail potential. When the output of amplifier IC2A goes negative, diode D3 provides a fixed base for the divider near the zero volt line so that during the period that the output of amplifier IC2A is negative the aiming level is brought down to approximately 8 volts. This is compared with the voltage on the capacitor C4 by the comparator IC2B, and if the capacitor voltage is higher than the aiming level a pulse will be produced at the output of amplifier IC2B. If the thyristor 15 is not conducting and the power supply is ready, this in turn causes the pulse generator 37 to produce a single pulse, as described above.

The resistor R18 sets the charging rate of capacitor C4, which controls the maximum frequency at which output pulses can be produced, and thus the slip frequency at which the thyristor 3 is fired. The optimum angle of firing is achieved by reducing the aiming level to a value below the maximum positive capacitor voltage only at the correct firing point, that is when the diodes 11 and 13 are just starting to conduct. Zener diode Z4 prevents capacitor C4 charging up to the positive rail potential and therefore to the aiming level before diode 13 starts to conduct and also ensures that a pulse will be produced irrespective of how fast the machine is running up, so long as a half cycle of the correct length, or longer, has been timed. The aiming level being at the positive rail potential during the timing period helps to remove any possibility of spurious pulses being developed.

During synchronisation on reluctance neither of diodes 13 and 17 conducts and the inputs to circuits 25 and 29 are respectively about −2 volts, coming from the voltage divider comprising resistors R4 and R5, and about +2 volts produced by the pull-up resistor R7 and zener diode Z1.

The input to circuit 25 has the effect of turning off transistor TR2, allowing the output of amplifier IC2A to go high and thus capacitor C4 can charge up. After the time set by the resistor R18 the pulse generator 37 will be armed and ready to produce a firing pulse, when and if diode 13 starts to conduct, for example if the machine pulls in on reluctance and then drops out of synchronism before the reluctance firing circuits can apply the field.

The +2 volt signal appearing at the input of circuit 29 causes the output of amplifier IC1B to go to the positive rail, this enabling capacitor C9 to charge up via resistor R43. During the machine run up period, when the thyristor 15 and diode 17 start to conduct the input to circuit 29 is approximately −1 and so the output of amplifier IC1B goes to the negative rail and capacitor C9 discharges through resistor R42, with a shorter time constant than the charging cycle. Diode D9 prevents the voltage on the capacitor C9 falling below −0.8 volts and so gives the same base level for each charging cycle.

When the voltage on capacitor C9 reaches the level set by zener diode Z9, the output of comparator IC1C switches from the negative rail to the positive rail. This takes approximately 2.5 seconds from the time diode 17 and thyristor 15 last conducted. When the output of comparator IC1C switches to the positive rail an output pulse is delivered to thyristor 3 via circuits 47, 45 and 49, the required pulse current being drawn from capacitors in the output circuit 45. This reduces the voltage on these capacitors to below a threshold level set in circuit 41 causing the clamp 39 to operate and terminate the pulse. The capacitors in circuit 45 then recharge from power supply 43 and on reaching the threshold level the clamp applied by circuit 39 is removed and a further output pulse delivered to thyristor 3. Thus the unit considers the machine to be synchronised on reluctance if thyristor 15 has not conducted for 2.5 seconds and delivers a continuous train of pulses to thyristor 15 providing that thyristor 15 remains non-conducting.

We claim:

1. A synchronous motor comprising: a stator winding; a rotor; an a.c. exciter winding mounted on the rotor; a field winding mounted on the rotor and arranged for excitation by the rectified output of the a.c. exciter, and a synchronizing arrangement for delaying energization of the field winding by the exciter until the rotor is rotating approximately at the same speed as the rotating field produced by the stator winding of the motor, and the rotor is correctly positioned relative to this rotating field, the synchronizing arrangement comprising: a pair of rectifying devices connected in parallel, oppositely poled, across the motor field winding, one of the devices being controllable and poled so as to be forward biassed by the rectified output of the a.c. exciter; trigger means for the controllable device whereby the controllable device is rendered conducting when the voltage across the field winding foward biasses said controllable device and exceeds a predetermined value; means for deriving two discrete signals respectively continuously representative of current flow in the two rectifying devices; and control means responsive to said two signals to connect the field winding with the rectified output of the a.c. exciter when either (a) no current has passed through the controllable rectifying device for a predetermined time, or (b) the motor field winding current, as indicated by the current in either rectifying device, has a frequency below a predetermined value, the controllable rectifying device is not conducting, and the uncontrolled rectifying device has started to conduct.

2. A synchronous motor according to claim 1 wherein said means for deriving said signals comprises two further uncontrolled rectifying devices respectively connected in series with and with the same polarity as said first-mentioned pair of rectifying devices, and said control means is responsive to the voltages across said further rectifying devices.

3. A synchronous motor according to claim 1 wherein said trigger means comprises a pair of voltage breakdown diodes connected in series across said controllable rectifying device, the control electrode of the controllable rectifying device being connected to the junction between the voltage breakdown diodes.

4. A synchronous motor according to claim 1 including a holding resistance connected across said motor field winding.

5. A synchronous motor according to claim 1 wherein said rectifying devices are connected across said motor field winding via a starting resistance.

6. A synchronous motor according to claim 1 wherein the a.c. exciter is connected to the field winding via at least one further controllable rectifying device and the control means incorporates a pulse generator which, when said frequency is below said predetermined value and said first mentioned controllable rectifying device is not conducting, applies a firing pulse to said further controllable rectifying device each time said first-mentioned uncontrolled rectifying device starts to conduct.

7. A synchronous motor according to claim 6 wherein, when no current has passed through the first-mentioned controllable rectifying device for a predetermined time, said pulse generator applies a train of firing pulses to said further controllable rectifying device.

8. A synchronous motor according to claim 1 wherein the control means is powered from the output of the a.c. exciter.

* * * * *